(12) United States Patent
Wang

(10) Patent No.: US 6,967,645 B2
(45) Date of Patent: Nov. 22, 2005

(54) ENCODER DEVICE COMBINED WITH A ROLLER

(75) Inventor: Wei-Chuan Wang, Taipei (TW)

(73) Assignee: Kye Systems Corp., Taipei Hsien (TW)

( * ) Notice: Subject to any disclaimer, the term of this patent is extended or adjusted under 35 U.S.C. 154(b) by 252 days.

(21) Appl. No.: 10/191,471

(22) Filed: Jul. 10, 2002

(65) Prior Publication Data

US 2004/0008190 A1    Jan. 15, 2004

(51) Int. Cl.[7] .................................................. G09G 5/08
(52) U.S. Cl. ...................................... 345/167; 345/184
(58) Field of Search ................................ 345/167, 184; 200/4, 5 A, 5 R, 52 R; 74/22 A, 22 R, 23–25

(56) References Cited

U.S. PATENT DOCUMENTS

| | | | | |
|---|---|---|---|---|
| 4,410,775 A | * | 10/1983 | Howard | ..................... 200/52 R |
| 5,220,731 A | * | 6/1993 | Waclawik et al. | ............ 33/773 |
| 5,657,051 A | | 8/1997 | Liao | |
| 5,912,661 A | | 6/1999 | Siddiqui | |
| 6,137,477 A | * | 10/2000 | Hu | .............................. 345/163 |
| 6,198,057 B1 | | 3/2001 | Sato et al. | |
| 6,291,782 B1 | * | 9/2001 | Isikawa | ....................... 200/14 |
| 6,326,949 B1 | | 12/2001 | Merminod et al. | |

\* cited by examiner

*Primary Examiner*—Ricardo Osorio
*Assistant Examiner*—Tom Sheng
(74) *Attorney, Agent, or Firm*—Bacon & Thomas, PLLC

(57) ABSTRACT

An encoder device coupled to a roller or "scroll wheel" includes a mechanism to convert a rotating movement of the roller into a reciprocating movement that causes intermittent electrical conduction between two metal contacts so as to output an intermittent electrical signal indicative of roller movement without continuous power consumption.

13 Claims, 5 Drawing Sheets

ENCODER DEVICE COMBINED WITH A ROLLER

FIELD OF THE INVENTION

The present invention relates to an encoder, and particularly to an encoder device that includes a mechanism for converting a rotating movement of a roller or "scroll wheel" into a piston-like reciprocating movement that intermittently causes electric conduction between two metal contacts. The mechanism instantly outputs an electrical signal when contact is made, and cuts off the electric conduction when contact is broken so as to save power while still tracking movement of the roller.

BACKGROUND OF THE INVENTION

Input or output devices having a roller thereon are becoming increasingly popular. The roller is typically arranged to enable a user to scroll a display on a screen. If the roller if depressed, an extra predetermined program or function will be activated, such as logging onto the internet, receiving e-mails, and so forth. Because of the convenience of the roller, manufacturers are rushing to create or to build related structures or methods for practical use.

U.S. Pat. No. 5,912,661, U.S. Pat. No. 6,157,369, and U.S. Pat. No. 6,326,949 show conventional encoder devices that utilize a grating wheel and in which a light transmitter and a light detector are located at each side of the grating wheel. The projected light from the transmitter is intermittently blocked by a plurality of slots on the grating wheel that causes the detector to sense the changes in dark and light as to output an intermittent electrical signal. Disadvantages of this arrangement are that the transmitter and detector must be in precise alignment, and the transmitter must emit light continuously even when the grating wheel blocks transmission, so that further movement of the grating wheel can be detected.

U.S. Pat. No. 6,198,057 shows an alternative arrangement in which a rotary encoder 2 is coupled with an axle 5 of a roller 4, and a plurality of brushes are rotatably-connected with a corresponding number of contacts to generate an intermittent signal. This arrangement is simpler to assemble than optical encoders, and only a generates and electric signal when contact is made, but still requires relatively precise alignment of contacts and encoder wheel.

Finally, U.S. Pat. No. 5,657,051 discloses a switch-like encoder arranged to output intermittent signals following depression of a user's finger. The structure is easy to build, but the way that the user has to move his finger forward and backward tends not only to cause fatigue over the user's hand, but also inconvenience in use in comparison with the roller type.

SUMMARY OF THE INVENTION

The primary object of the present invention is to provide a stable, small size and power-saving encoder device to output an electrical signal.

The encoder device combines with a roller with a mechanism for converting the rotating movement of the roller into a piston-like reciprocating movement that intermittently causes electric conduction so as to instantly output an electrical signal whenever the mechanism established contact between two contact elements.

The various objects and advantages of the present invention will be more readily understood from the following detailed description when read in conjunction with the appended drawing.

DETAILED DESCRIPTION OF THE PREFERRED EMBODIMENTS

The present invention relates to an encoder which includes a roller. Whenever a user rotates the roller, the rotating movement of the roller is converted into a reciprocating movement that intermittently closes a circuit to generate an electrical signal. The electrical signal may be used to control the scrolling of a display on a screen.

Figure 1:
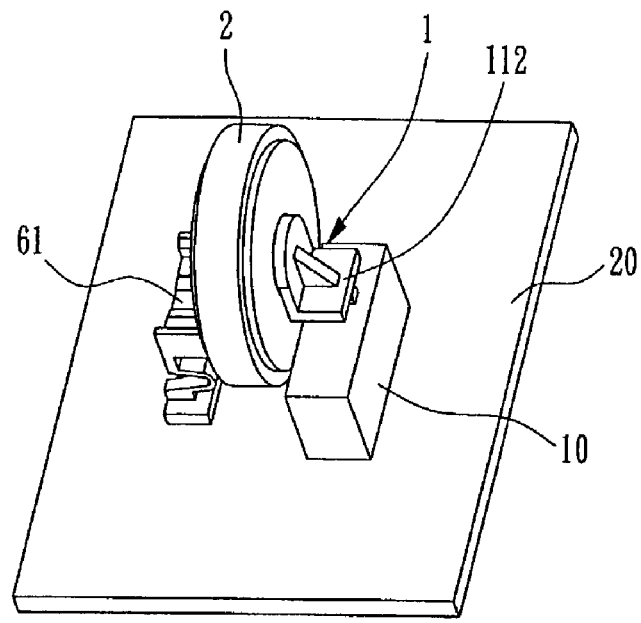
FIG. 1 is a perspective view of the present invention.

A preferred embodiment of the present invention includes a depressing unit, a roller, movement-conversion unit, a roller-supporting unit, and an electricity-conducting unit. Referring to FIG. 1, a roller 2 can be rotated forward and backward, and further can be depressed forcing a depressing portion 112 of a depressing plate 1 to activate a micro switch 10 located on a circuit board 20 that enables a further program or function to be presented on the screen, such as logging on the internet or opening an email, etc.

Figure 2:
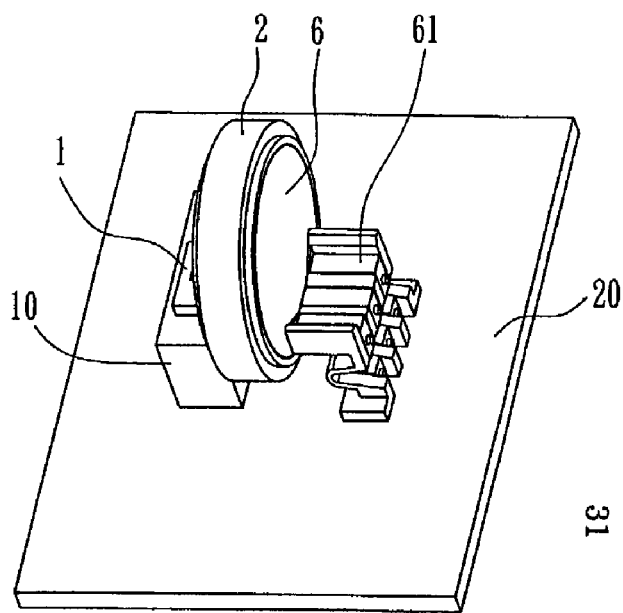
FIG. 2 is another perspective view of FIG. 1.

Referring to FIG. 2. the roller 2 is secured to a roller supporter 6 of a roller support unit that includes a flexible structure 61 which has a plurality of curved structures. One end of the structure 61 is fixed on the circuit board 20, and the other end of the structure 61 is coupled to the roller supporter 6. As shown in FIGS. 1 and 2, when a user depresses the roller 2, the flexible structure 61 will be deformed at the same time so as to force the depressing portion of a depressing plate 1 to activate the micro switch 10 thereunder.

Figure 3:
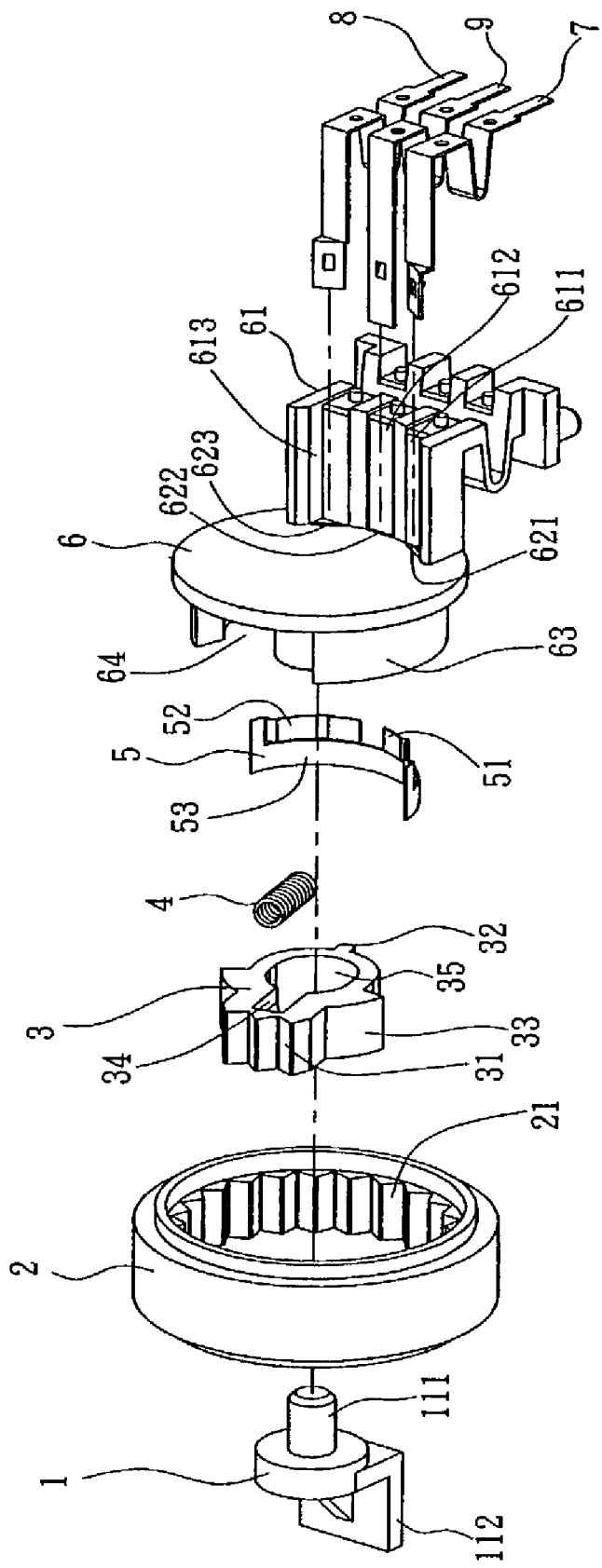
FIG. 3 is an exploded perspective view of the present invention.
Figure 4:
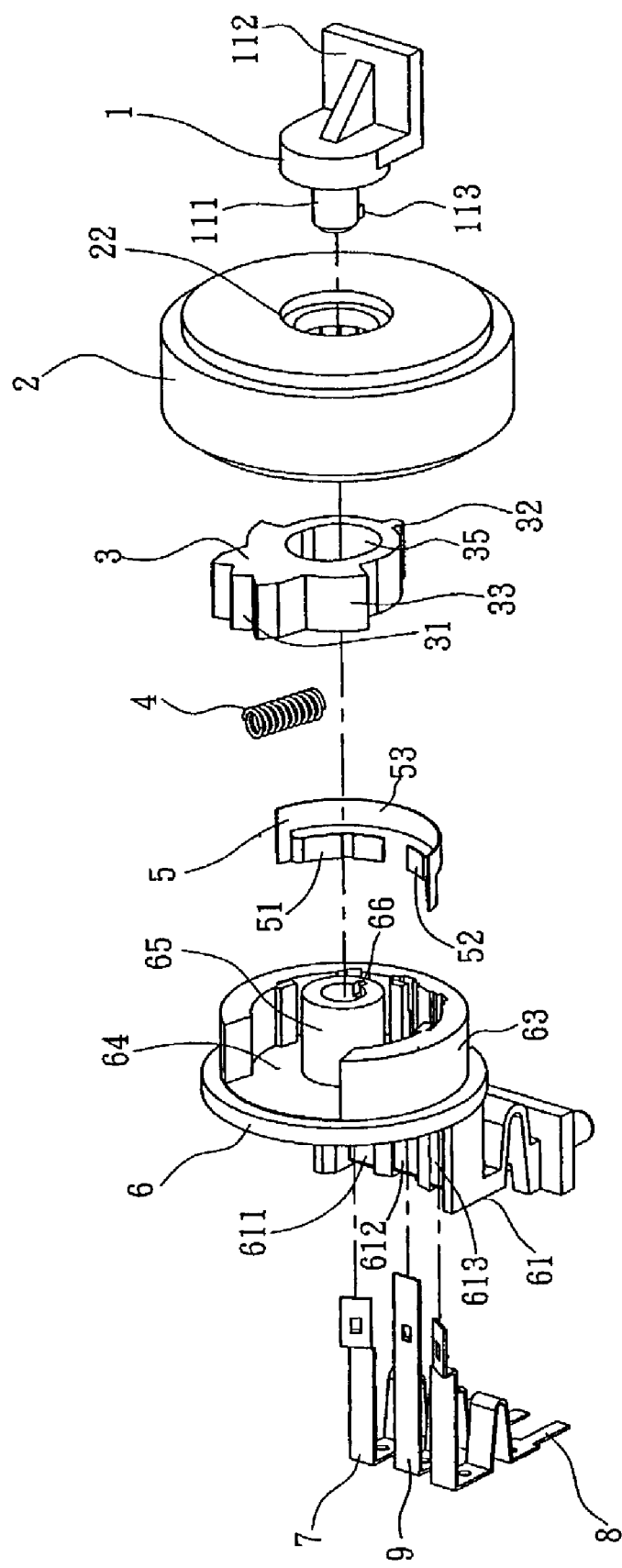
FIG. 4 is another exploded perspective view of FIG. 3.
Figure 5:
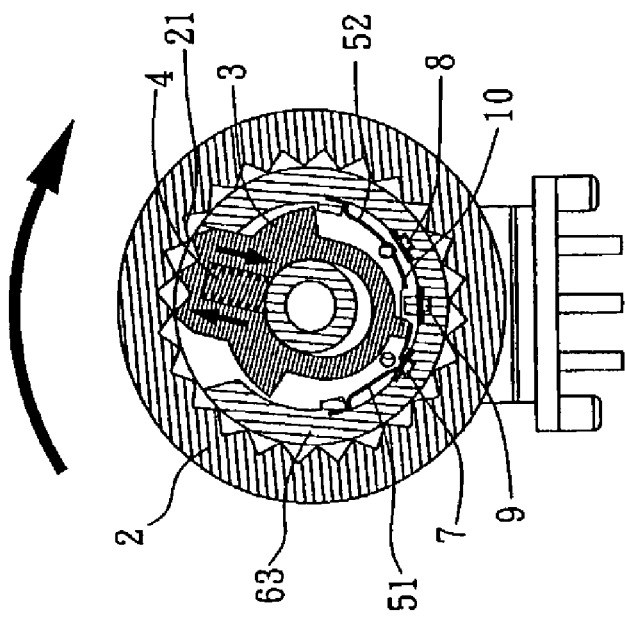
FIG. 5A is a sectional view of the present invention when the roller rotates clockwise.
FIG. 5B is another sectional view of FIG. 5A where the roller at a position generating an output signal and the roller keeps rotating clockwise.
Figure 5:
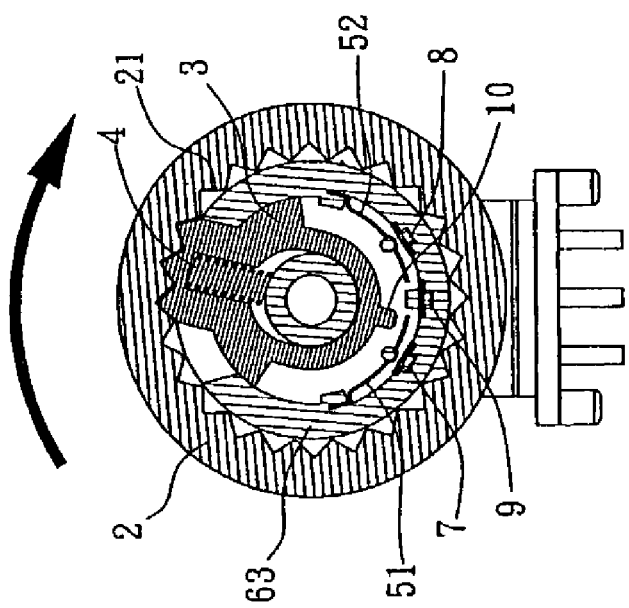

FIGS. 3 and 4 illustrate the relationship between various additional components of the preferred embodiment. An extending axle 111 extends from one side of the depressing plate, and a depressing portion 112 extends from the other side so as to enable activation of the micro switch 10. The roller 2 has an open side which has an inner-rim with a plurality of roller teeth 21, and a closed side where a hole 22 is located at a center of the roller 2 allowing penetration of the extending axle 111. The open side of the roller 2 and the roller support unit provide a space in between to contain the movement conversion unit.

The movement-conversion unit includes a slider 3 and a resilient element 4. The top end of the slider has slider teeth 31 to match with the roller teeth 21, while the lower end of the slider has a protrusion 32. The center of the slider 31 has a through-opening 35, and a recess 34 beneath the slider teeth 31 which contains a resilient element 4 therein.

Referring to FIGS. 3–5A. The roller-supporting unit includes the above-described roller supporter 6, one side of which includes a flexible structure 61, which is fixed to circuit board 20 or alternatively to a portion of a housing which contains the present invention. The other side of the roller supporter 6 has a cylindrical wall 63 enclosed within the roller 2. The top end of the wall 63 has an opening 64 that enables the teeth 31 to be positioned within the opening 64. When the roller 2 is still, two shoulders 33 of slider 3 constantly contact the inner-rim of the cylindrical wall 63 due to the bias provided by the resilient element 4, such that the slider teeth 31 constantly protrude from the opening 64.

The cylindrical wall 63 has a hollow axle 65 therein that penetrates the through-hole 35. When the roller supporter 6 is coupled to the slider 3, roller 2, and the depressing plate 1 together, the resilient element 4 presses against the hollow axle 65, which also fixedly couples to the extending axle 111 of the depressing plate 1. In practical use, the hollow axle 5 is tightly matched with the extending axle 111 such that the roller 2 and slider 3 can move relative to the roller supporter 6, while the depressing plate 1 is prevented from rotating together with roller 2. Alternatively, as shown in FIG. 4. rotation of the depressing plate 1 with roller 2 relative to roller supporter 6 is prevented by providing the hollow axle 65 with a groove 66 inside, and the extending axle 111 with a pin 113 thereon. In that case, the pin 113 is tightly coupled to the groove 66 so as to rotatably support the roller 2, slider 3, without causing rotation of the depressing plate 1 with the roller 2.

Furthermore, the flexible structure 61 has leading grooves 611, 612, 613. The intersection between the leading grooves 611, 612, 612 and the roller supporter 6 has three corresponding opening 621, 622, 623.

Referring to FIGS. 3–5A, the electricity-conducting unit has three contacts 7, 8, 9, and a metal plate 5. A lower section of the metal plate 5 has a ring portion 53, and a higher section has two projections 51, 52. In addition, the metal plate 5 is fixed within the cylindrical wall 63. When the roller supporter 6 is coupled to metal plate 5, resilient element 4, slider 3, roller 2 and depressing plate 1, the contacts 7, 8, 9 are located within the leading grooves respectively and extend through the openings 621, 622, 623 toward metal plate 5 such that the contacts 7, 8 are located just under the projections 51, 52 respectively and the contact 9 is in constant electrical contact with the ring portion 53.

As shown in FIG. 5A, when a user rotates the roller 2 clockwise, with the roller teeth 21 and slider teeth 31, the slider 3 will rotate to a certain angle, and then stop turning due to engagement between an outer one of the slider teeth 31 and cylindrical wall 63. As shown in FIG. 5B, if the roller 2 keeps turning, the stopped slider 3 will be moved due to the roller teeth 21 gradually pushing the slider teeth 31 toward the hollow axle 65, such that the protrusion 32 will cause the projection 51 to push on contact 7, which will engage contact 9 to establish an electrical connection between the contacts 7 and 9 and thereby generate an electrical signal.

If the roller 2 keeps turning, the compressed resilient element 4 will push the slider 3 away from the hollow axle 65 that is led by the roller teeth 21 to mesh again with the slider teeth 31. Therefore, the contacts 7 and 9 will have no electrical conduction therebetween, causing no electrical signal to be generated, or power to be consumed.

Figure 6A:
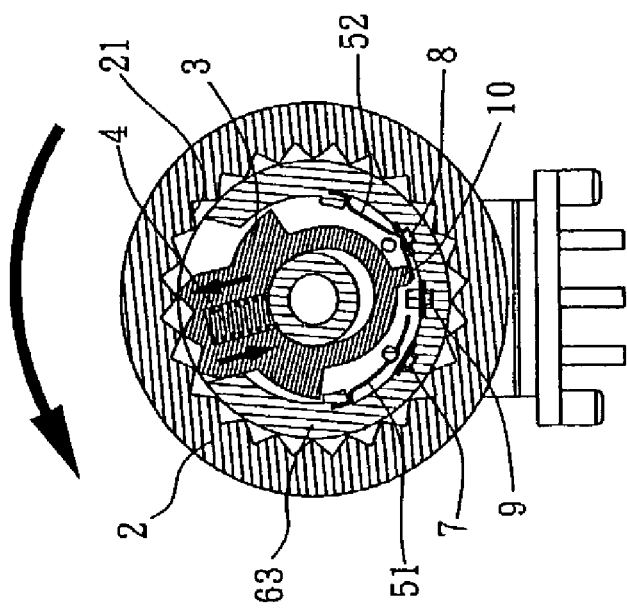
FIG. 6A is a sectional view of the present invention when the roller rotates counterclockwise.
Figure 6B:
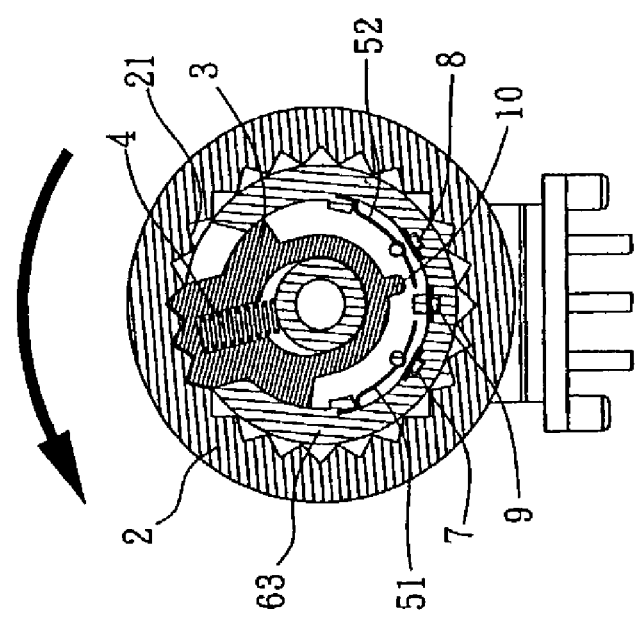
FIG. 6B is another sectional view of FIG. 6A where the roller at a position generating an output signal and the roller keeps rotating counterclockwise.

Turning to FIG. 6A, when a user rotates the roller 2 counterclockwise, the slider 3 together with the roller teeth 21 and slider teeth 31 will rotate to a certain angle, and then stop turning due to another outer one of the slider teeth 31 rotating against cylindrical wall 63. As shown in FIG. 6B, if the roller 2 keeps turning, the stopped slider 3 will be moved due to the roller teeth 21 gradually pushing the slider teeth 31 toward the hollow axle 65, such that the protrusion 32 will directly push the projection 52 against contact with contact 8, and cause contacts 8 and 9 to form an electrical connection therebetween as to generate an electrical signal.

If the roller 2 keeps turning, the compressed resilient element 4 will push the slider 3 away from the hollow axle 65 and cause the roller teeth 21 to re-mesh with the slider teeth 31. Therefore, the contacts 8 and 9 no longer electrically conduct, causing no electrical signal at this moment.

However, if the user keep rotating the roller 2 clockwise or counterclockwise, the slider 3 will carry out a reciprocating movement such that a lasting and intermittent electrical signal can be obtained.

In additional, referring to FIG. 5A, the roller teeth 21 slightly contact the cylindrical wall 63 of the roller support 6. Therefore, depressing the roller 2 will force the roller supporter 6 to deform the flexible structure 61 so as to activate the micro switch 10 to present an extra predetermined function or program. With the structure listed above, the rotating of the roller clockwise or counterclockwise will not only scroll the display on a screen, but also further activate an extra function or program by depressing the micro switch 10. The present invention can apply to any IA (intelligence appliance) products, any input or output device, such as a trackball, keyboard, game controller, mouse, or even a telephone, or the like.

Having thus described a preferred embodiment of the present invention in detail, it will be appreciated that the invention may be varied in many ways. Such variations are not to be regarded as a departure from the spirit and scope of the present invention, and all such modifications as would occur to one skilled in the art are intended to be included within the scope of the following claims.

What is claimed is:

1. An encoder device for generating a signal indicative of movement of a roller, comprising:
   a movement-conversion unit;
   a roller-supporting unit; and
   an electricity-conducting unit;
   wherein said roller is rotatably supported by said roller supporting unit,
   wherein said roller is rotatable relative to the roller supporting unit,
   wherein said movement conversion unit is arranged to reciprocate in response to rotation of said roller and intermittently cause electrical conduction in said electricity-conducting unit, thereby generating said intermittent electrical signal indicative of movement of the roller,
   wherein said reciprocating movement of said movement conversion unit intermittently causes electrical contacts in said electricity-conducting unit to engage each other and thereby cause said electrical conduction,
   wherein said movement-conversion unit and electricity conducting unit are positioned within an open side of said roller, and
   further comprising a depressing unit arranged such that when the roller is depressed, the roller-supporting unit is deformed simultaneously to activate a micro switch.

2. The encoder device as claimed in claim 1, wherein the movement-conversion unit includes a slider having teeth and a resilient element arranged to bias the slider against an inner rim of the roller, said inner rim of said roller including a plurality of teeth arranged to mesh with the teeth of the slider and thereby cause rotation of said slider together with said roller, and wherein said roller supporting unit include a pair of walls for preventing further rotation of said slider with said roller, whereby when said slider engages one of said walls, said slider is pushed by said teeth of said roller in a direction that causes said slider to push against one of said contacts and cause said contacts to touch each other, and whereby upon further rotation of said slider, said resilient element causes said teeth of said slider to re-mesh with said teeth of said roller such that said slider no longer causes said contacts to touch each other.

3. The encoder device as claimed in claim 1, wherein said electricity-conducting unit is fixed with respect to said roller supporting unit.

4. The encoder device as claimed in claim 1, wherein the depressing unit has an extending axle penetrating an opening of the side of the roller to further couple to a hollow axle of the roller-supporting unit.

5. An encoder device for generating a signal indicative of movement of a roller, comprising:
   a movement-conversion unit;
   a roller-supporting unit; and
   an electricity-conducting unit;
   wherein said roller is rotatably supported by said roller supporting unit,
   wherein said roller is rotatable relative to the roller supporting unit,
   wherein said movement conversion unit is arranged to reciprocate in response to rotation of said roller and intermittently cause electrical conduction in said electricity-conducting unit, thereby generating said intermittent electrical signal indicative of movement of the roller,
   wherein said reciprocating movement of said movement conversion unit intermittently causes electrical contacts in said electricity-conducting unit to engage each other and thereby cause said electrical conduction, and
   wherein one of said contacts is a conductive plate and the other of said contacts includes a plurality of contact members, said plurality of contact members being respectively connected to a circuit board, and further comprising a slider arranged to engage said plate with one of said contact members depending on a direction of rotation of said roller.

6. The encoder device as claimed in claim 5, wherein said movement conversion unit and said electricity-conducting unit are positioned within an open side of said roller, said electricity-conducting unit being fixed with respect to said roller supporting unit.

7. The encoder device as claimed in claim 5, further comprising a depressing unit arranged such that when the roller is depressed, the roller-supporting unit is deformed simultaneously to activate a micro switch.

8. The encoder device as claimed in claim 7, wherein the depressing unit has an extending axle penetrating an opening of the side of the roller to further couple to a hollow axle of the roller-supporting unit.

9. An encoder device for generating a signal indicative of movement of a roller comprising:
   an electricity-conducting unit; and
   a movement-conversion unit including a slider having teeth and a resilient element arranged to bias the slider against an inner rim of the roller, said inner rim of said roller including a plurality of teeth arranged to mesh with the teeth of the slider and thereby cause rotation of said slider together with said roller,
   wherein when said slider engages a wall of a roller supporting unit, said slider is pushed by said teeth of said roller in a direction that causes electrical contacts in said electricity-conducting unit to touch each other, and
   wherein upon further rotation of said slider, said resilient element causes said teeth of said slider to re-mesh with said teeth of said roller such that said slider no longer causes said contacts to touch each other.

10. The encoder device as claimed in claim 9, wherein said movement conversion unit and said electricity-conducting unit are positioned within an open side of said roller.

11. The encoder device as claimed in claim 9, wherein one of said contacts is a conductive plate and the other of said contacts includes a plurality of contact members, said plurality of contact members being respectively connected to a circuit board, said slider being arranged to engage said plate with one of said contact members depending on a direction of rotation of said roller.

12. The encoder device as claimed in claim 9, further comprising a depressing unit arranged such that when the roller is depressed, the roller-supporting unit is deformed simultaneously to activate a micro switch.

13. The encoder device as claimed in claim 12, wherein the depressing unit has an extending axle penetrating an opening of the side of the roller to further couple to a hollow axle of the roller-supporting unit.

* * * * *